(12) United States Patent
Sengupta et al.

(10) Patent No.: US 9,573,090 B2
(45) Date of Patent: Feb. 21, 2017

(54) SUPERADSORBENT MATERIAL SYSTEM FOR IMPROVED FILTRATION APPLICATIONS

(71) Applicant: BAE Systems Information and Electronic Systems Integration Inc., Nashua, NH (US)

(72) Inventors: Somnath Sengupta, Ellicott City, MD (US); Robert A. Burton, Columbia, MD (US); Barry W. Treadway, Rockville, MD (US); Christopher L. Rector, Jonesborough, TN (US); Pierre-Alain S. Auroux, Rockville, MD (US); Siddharth Singh, Lafayette, CA (US); John E. King, Ellicott City, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/007,305

(22) Filed: Jan. 27, 2016

(65) Prior Publication Data
US 2016/0136563 A1 May 19, 2016

Related U.S. Application Data

(62) Division of application No. 14/350,583, filed as application No. PCT/US2013/051478 on Jul. 22, 2013, now Pat. No. 9,278,335.

(60) Provisional application No. 61/681,272, filed on Aug. 9, 2012.

(51) Int. Cl.
*B01D 53/02* (2006.01)
*B01J 20/30* (2006.01)
(Continued)

(52) U.S. Cl.
CPC .............. *B01D 53/02* (2013.01); *B01J 20/205* (2013.01); *B01J 20/28004* (2013.01); *B01J 20/2808* (2013.01); *B01J 20/2809* (2013.01); *B01J 20/28066* (2013.01); *B01J 20/28076* (2013.01); *B01J 20/305* (2013.01); *B01J 20/3021* (2013.01); *B01D 2253/102* (2013.01); *B01D 2253/112* (2013.01); *B01D 2253/25* (2013.01); *B01D 2253/304* (2013.01);
(Continued)

(58) Field of Classification Search
CPC .................. B01D 2253/102; B01D 2253/306; B01D 2253/308; B01D 2253/31; B01D 2253/311; B01D 2257/708; B01D 2257/93; B01D 53/02; B01J 20/305
See application file for complete search history.

(56) References Cited

U.S. PATENT DOCUMENTS 2,257,907 A 10/1941 Griswold
3,246,950 A 4/1966 Gruber
(Continued)

FOREIGN PATENT DOCUMENTS

EP 13827822.1 3/2016
WO PCT/US2013/51478 7/2013

*Primary Examiner* — Christopher P Jones
(74) *Attorney, Agent, or Firm* — Scott J. Asmus

(57) ABSTRACT

The present invention involves the use of nanoporous carbons derived from partially or fully demetalized metal carbides in personal protection equipment for the reversible absorption/adsorption of both broad and specific targeted gases. These materials have been specifically processed to provide enhanced effective loadings against specific harmful volatile organic compounds.

20 Claims, 6 Drawing Sheets

Related U.S. Application Data

(51) Int. Cl.
*B01J 20/20* (2006.01)
*B01J 20/28* (2006.01)

(52) U.S. Cl.
CPC .. *B01D 2253/306* (2013.01); *B01D 2253/308* (2013.01); *B01D 2253/31* (2013.01); *B01D 2253/311* (2013.01); *B01D 2253/34* (2013.01); *B01D 2257/708* (2013.01); *B01D 2257/93* (2013.01)

(56) References Cited

U.S. PATENT DOCUMENTS

| | | |
|---|---|---|
| 4,738,828 A | 4/1988 | Brooks |
| 5,217,930 A | 6/1993 | Dubots |
| 6,372,130 B1 | 4/2002 | Gjerde et al. |
| 6,495,115 B1 | 12/2002 | Dunmead et al. |
| 7,972,512 B2 | 7/2011 | Conner |
| 8,475,747 B1 | 7/2013 | Johnson et al. |
| 2002/0049132 A1 | 4/2002 | Jan et al. |
| 2007/0179050 A1 | 8/2007 | Ma et al. |
| 2009/0117094 A1 | 5/2009 | Leis et al. |
| 2009/0301902 A1 | 12/2009 | Gogotsi et al. |
| 2010/0065991 A1 | 3/2010 | Greulich-Weber et al. |
| 2011/0053050 A1 | 3/2011 | Lim et al. |
| 2011/0151007 A1 | 6/2011 | Burton |
| 2011/0244012 A1 | 10/2011 | Iida et al. |
| 2012/0093709 A1 | 4/2012 | Gogotsi et al. |
| 2013/0045865 A1 | 2/2013 | Thompson et al. |
| 2013/0112605 A1 | 5/2013 | Wyndham et al. |
| 2013/0310253 A1 | 11/2013 | Tabata et al. |
| 2013/0315817 A1 | 11/2013 | Yamanoi et al. |

SUPERADSORBENT MATERIAL SYSTEM FOR IMPROVED FILTRATION APPLICATIONS

RELATED APPLICATIONS

This is a divisional application of U.S. application Ser. No. 14/350,583 filed Apr. 9, 2014 and PCT/US2013/051478 filed Jul. 22, 2013 and claims the benefits of U.S. Provisional Application No. 61/681,272 filed Aug. 9, 2012 which is herein incorporated by reference in its entirety for all purposes.

FIELD OF INVENTION

The present invention relates to providing personal and public protection through enhanced filtration, and more particularly to a medium developed for the irreversible absorption or desorption of targeted gases. The medium is processed to yield a form factor (e.g., particle type, particle size, surface area, pore size, pore size distribution, total pore volume, functionality, etc . . . ) specific to the capture of a given gas (e.g., through use in chemical respirators).

BACKGROUND OF INVENTION

Current materials do not provide adequate ventilation protection against select chemical agents, toxic industrial compounds, toxic industrial materials, and other harmful volatile organic compounds. These chemicals have very low physical exposure limits yet are difficult to capture and retain in personal or collective filtration devices. This lack of performance leads to large, heavy respirator mask canisters that impede war fighter and emergency responder performance and field of view. Furthermore, the large mass and volume of current material required leads to a large pressure drop across the bed resulting in labored breathing in order to pull sufficient air through the mask tor respiration.

A need therefore exists for an improved adsorbent material in personal protection equipment to irreversibly adsorb targeted gases from the environment.

SUMMARY OF INVENTION

The present invention involves the use of nanoporous carbons derived from partially or fully demetalized metal carbides in personal protection equipment for the irreversible absorption and adsorption of both broad and specific targeted gases. These materials have been specifically processed to provide enhanced effective loadings against specific gases. This parameter corresponds to the amount of target gas the filtering medium is capable of adsorbing; the larger the effective loading, the more target gas is "trapped" into the medium. In particular, the medium has been modified to present a specific particle size distribution and to provide a high surface area and a high total pore volumes. Specifically, this medium was further designed to be highly porous (commonly 2,250 m$^2$/g) with tunable nanoscale pores (1-5 nm) of various pore shapes. The functionality that is added for the targeted adsorption/absorption of gases was also tailored to provide high effective loading capabilities in dry and wet atmospheric conditions as tested in relative humidity of 0% and 80% respectively.

One general aspect of the present invention is that it is at least seven times more adsorbent per unit mass than what is currently used. Compared to the prior art filtration material, the present invention has a much higher capacity to filter and retain chemical adsorbents across a broad class of chemical compounds. The invention also utilizes nanoporous carbons which are extremely hydrophobic while still able to capture volatile organic compounds, thus providing practical operation under high relative humidity. Furthermore, once adsorbed, the chemicals can be described to provide analysis of an exposure event.

Those skilled in the art will appreciate that the present invention will significantly improve the protection offered to the warfighter through the application of such material for personal filtration. For example, the present invention can be implemented as powders and substituted into existing gas masks. Alternatively, fibers of the material can be used and integrated into protective clothing. Finally, the invention can also be integrated into building filters for collective protection.

BRIEF DESCRIPTION OF DRAWINGS

The present invention is further described with reference to the following drawings wherein.

DETAILED DESCRIPTION

Nanoporous carbons outperform other state-of-the-art sorbent materials in both adsorption rate and capacity for various volatile organic compounds. The present invention can adsorb a broad range of volatile organic compounds, including toxic industrial compounds, and a limited number of chemical warfare-agents, even under conditions of 80% relative humidity.

Figure 1:
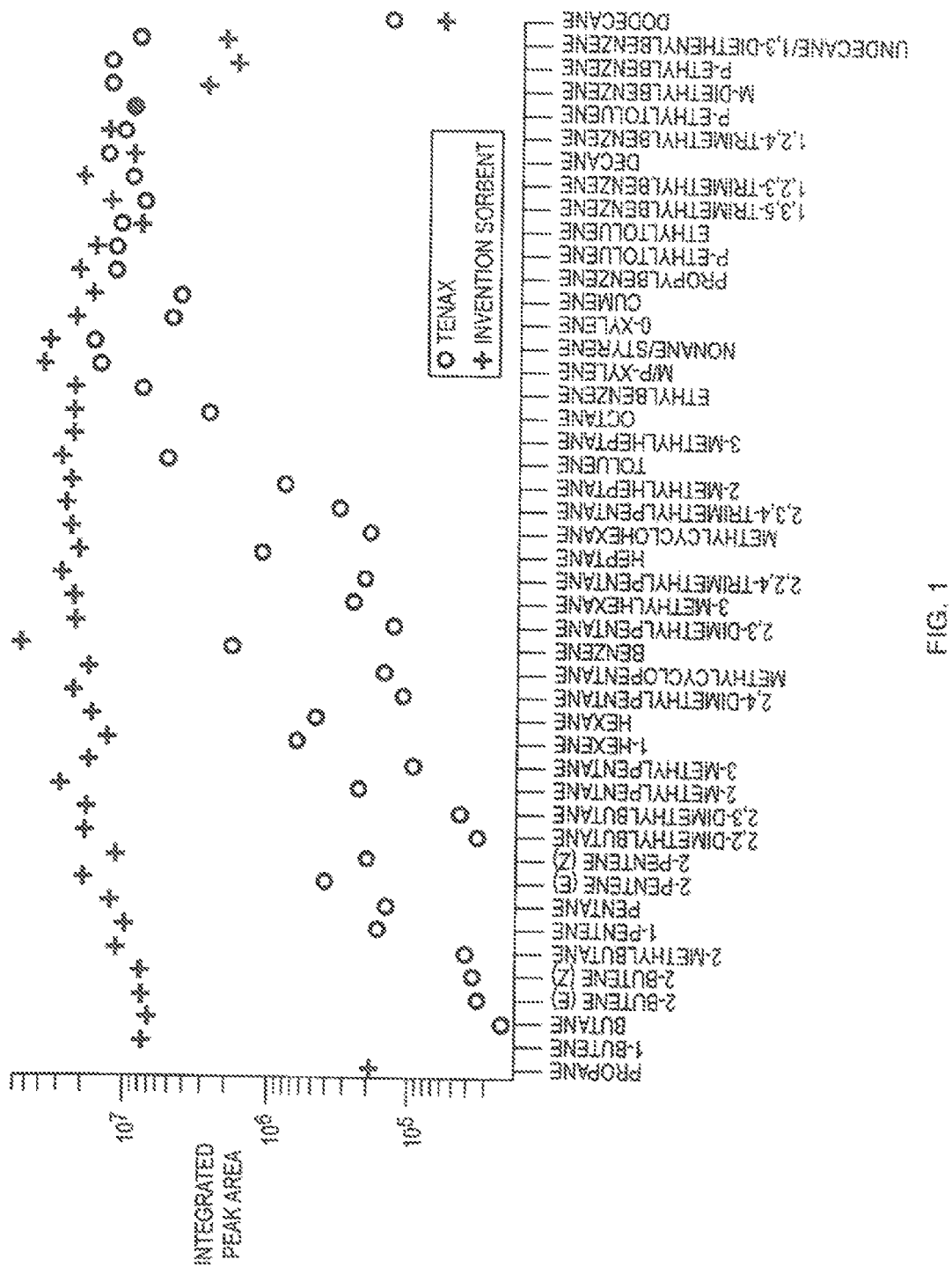
FIG. 1 is a graph displaying the gas chromatograph/mass spectrometer detection of 50 volatile organic compounds simultaneously adsorbed onto a nanoporous carbon and a standard sorbent.

The present invention is further defined by the following working embodiments:

Referring to FIG. 1, an experiment was performed to demonstrate the capability of one embodiment of the present invention to adsorb multiple compounds simultaneously without significant displacement or pore occlusion. At 7 L/min gas flow over 5 minutes of a 50 component 100 ppb hydrocarbon gas mix, 250 mg of nanoporous carbon outperformed 250 mg of a standard sorbent, and showed fairly linear adsorption capacity across molecular weights from 44 g/mol to 120 g/mol.

One embodiment of the present invention has established the relevance of using nanoporous carbide-derived carbons against difficult to capture toxic industrial compounds, and thus the capability of reducing the size of a filtration mask. In the following working example, baseline fully demetalized material as well as partially demetalized and surface functionalized materials were compared to the current widely used personal filtration medium for chemical respirators. Activated carbon impregnated with copper, Silver, Zinc, Molybdenum, and TriEthlyeneEiAmine, (ASZM-TEDA).

Comparison studies between nanoporous carbons and ASZM-TEDA required that a consistent flow rate through a packed bed of material be established. Particle size distribution analysis confirmed that nanoporous carbon particles are about 350 μm in diameter compared to the about 1.0 to 1.5 mm diameter activated charcoal particles of ASZM-TEDA. As a result of the size difference, packed beds of equivalent mass showed a much lower pressure drop across ASZM-TEDA packed beds as compared to the nanoporous carbon bed. Testing revealed that equivalent flow rates and pressure drops could be obtained if 200 mg of ASZM-TEDA was tested versus 30 mg of nanoporous carbon. Therefore, further testing was conducted using only 30 mg of nanoporous carbon in comparison to 200 mg of ASZM-TEDA.

The test conditions for determining the breakthrough point of 40 ppm acetonitrile (ACN) at 5 L/min were devised to yield physiologically relevant data. Given that the average mass of ASZM-TEDA in a personal filtration mask is about 120 grams and that the breathing rate under moderate exercise for an average male is about 30 L/min., our test of 200 mg ASZM-TEDA and 5 L/min ACN represents a 1/600th scale model. In these conditions, one minute of test gas exposure equates to about 20 minutes of field canister use.

The present invention was also tested to show that partial demetalization and surface functionalization of standard nanoporous carbon particles will improve the capture of difficult to trap molecules, such as ammonia.

Figure 2:
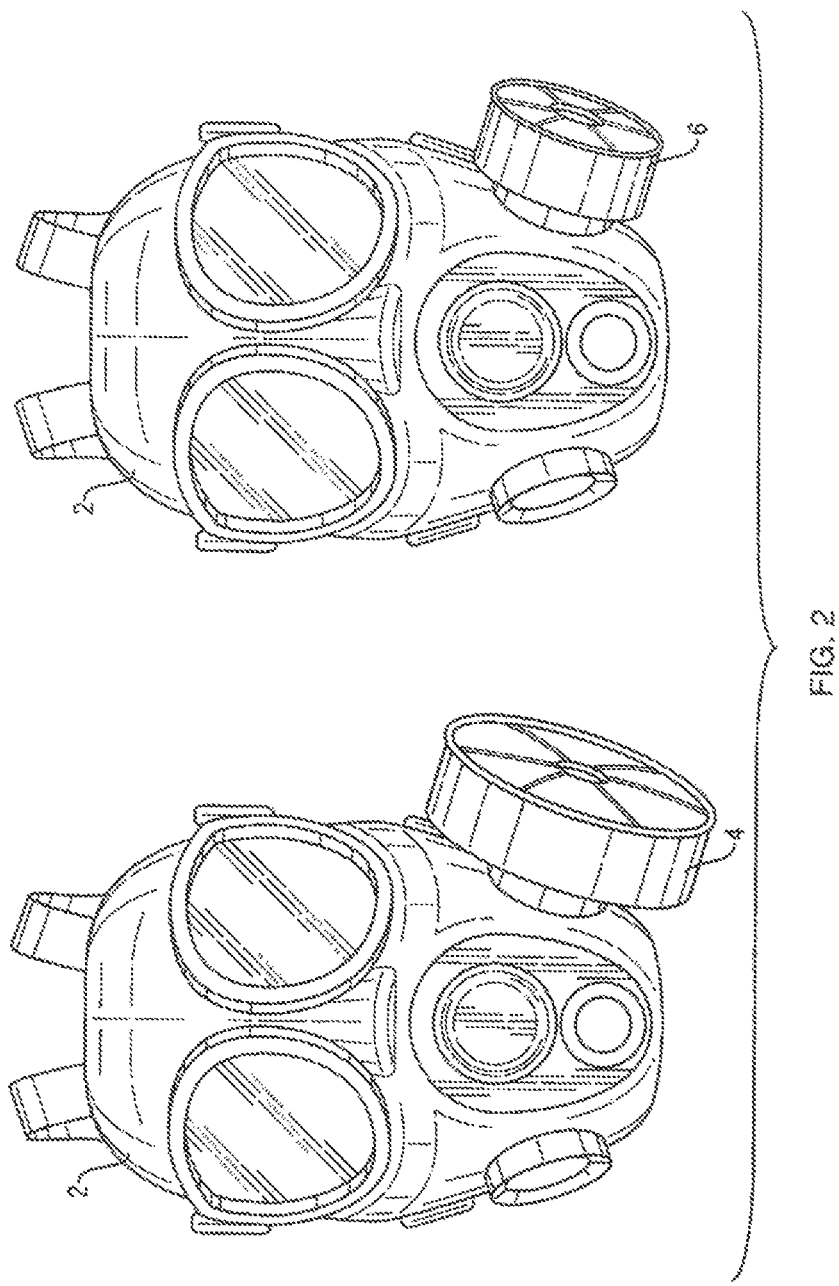
FIG. 2 is an image displaying the comparative sizes of the standard filtration mask canister (left) and the nanoporous carbon containing canister (right).

FIG. 2 shows one embodiment of the present invention a canister 6 of reduced size. Also portrayed in FIG. 2 is the difference between this embodiment and the prior art for chemical respirators, the current C2A1 canister 4. The difference in canister size is evident and represents an approximate 85% reduction in material weight and about 80% reduction in overall volume. The smaller sized C2A1 canister 6 still maintains equivalent pressure drop across the bed and improves performance by 100%. This also allows for easier breathing.

Additionally, because effective desorption when using nanoporous carbons requires elevated temperatures, for example, about 325° C. over 5 minutes, use of the present invention as a filtration media is highly attractive since no analyte desorption is expected at standard operating temperatures for this embodiment.

Figure 3:
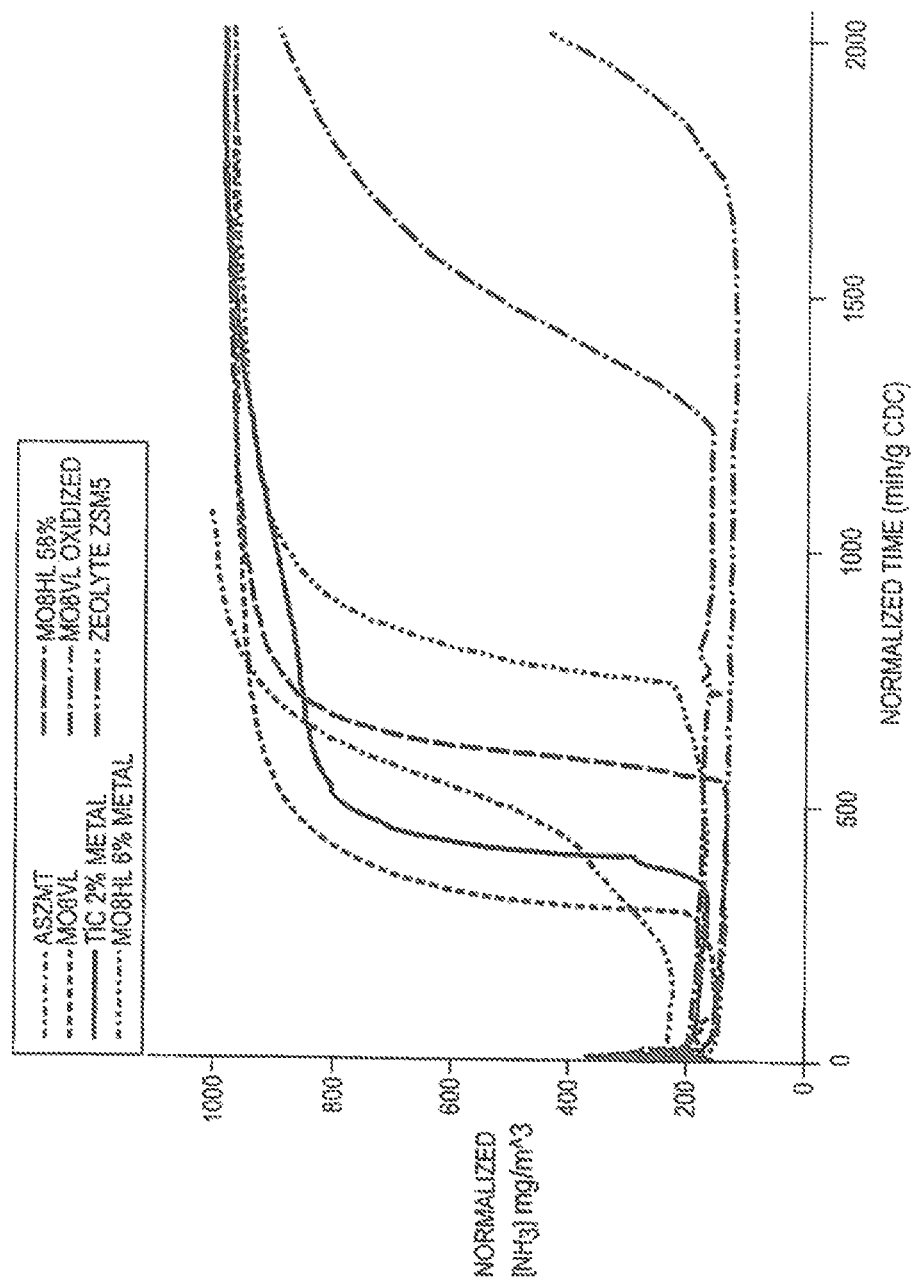
FIG. 3 is a graph displaying the performance of several different nanoporous carbons compared to the standard filtration mask.

Referring to FIG. 3, the data show that for ammonia ($NH_3$), the ASZM-TEDA material performs slightly better than a standard molybdenum or low percent residual titanium nanoporous carbon. However, it is interesting to note that the overall breakthrough profiles for the nanoporous carbons are much sharper than ASZM-TEDA. This sharper slope indicates improved complete protection until the material is defeated. Hydrogen treated nanoporous carbon (MO8HL) with about 5% residual metal performs better than ASZM-TEDA and the surface oxidized sample outperforms ASZM-TEDA by almost 300%. This long breakthrough time approaches that of the zeolyte ZSM5, which was specifically designed to trap $NH_3$ and does not perform well for other gases of interest.

The data in FIG. 3 was obtained using a 20 mg packed bed of material while flowing 1000 $mg/m^3$ of $NH_3$ through the bed at a rate of 20 ml/min. These working embodiments were conducted in helium as a helium ionization detector was used to determine the breakthrough curves. The displayed axes were normalized as min/g of material and 100% delivered gas for comparative purposes and to correct for test to test variability in the detector.

Other embodiments focused on improving the functionalization of the medium. Two paths were investigated in parallel: acid treatment and impregnation by a metal salt The study on the metal salt impregnation did not lead to any significant improvement in the effective loading despite varying several parameters (salt type, salt concentration of the CDC, etc . . . ). However, unexpected results were obtained from the study on acid treatment. During the optimization of the acid treatment, it was demonstrated that the performance of a functionalized $Mo_2C$ is comparable (and in some cases better) to the values obtained with the prior art ARC material.

One embodiment of this invention is the process or functionalization protocol which utilizes an acid treatment. In one working example of this embodiment, 300 mg of $Mo_2C$ was measured and put in a 40 ml vial. Then, 10 mL of nitric acid was added to the vial with $Mo_2C$. The vial was equipped with a condenser and placed on a pre-heated heating block. After heating, $Mo_2C$ was filtered through a sintered glass funnel and then thoroughly rinsed with distilled water until the rinsing water pH becomes neutral. $Mo_2C$ was then dried under vacuum at room temperature.

Figure 4:
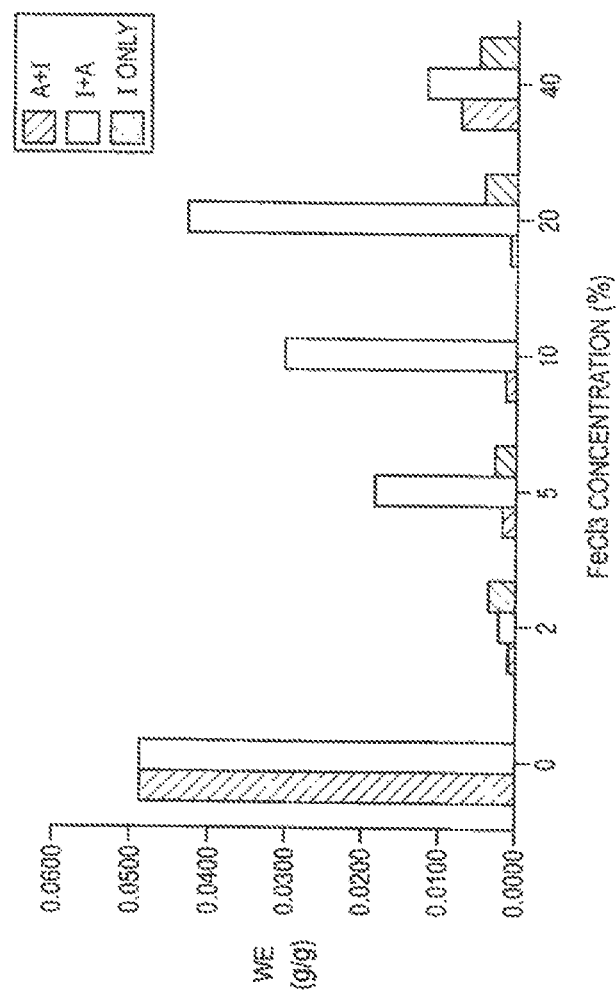
FIG. 4 is a graphical representation comparing various embodiments of the invention using acid, impregnation, and previous embodiments.

FIG. 4 is a graphical representation of the results of a second embodiment in which the surface of the carbide was activated with the acid treatment developed previously. The results are compared to acid treatment by itself (0% Fe3Cl sample) and to the impregnation only series (I series). The data indicates that the acid treatment alone enhances the effective loading at a higher rate than by combining it with impregnation. In order to investigate potential synergy between the impregnation and the acid treatment, another series was developed whereby the acid treatment followed the impregnation (I+A) series. The data was compared to the results obtained during the previous experiment (I series). As can be seen, performing the impregnation on activated carbide does not improve the effective loading capacity (A+I series). Although performing the acid treatment after the impregnation seems to produce some effects (especially at a concentration of 20% in metal salt), it does not surpass the capabilities of samples solely treated with acid treatment (0% Fe3Cl sample).

Figure 5:
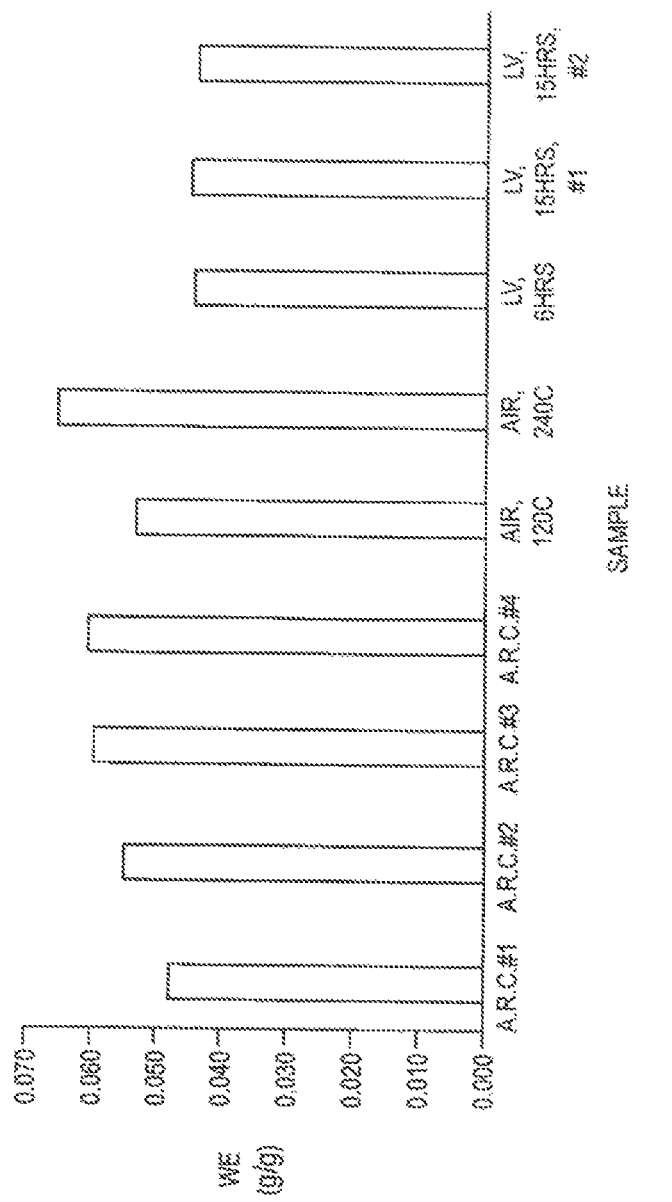
FIG. 5 is a graphical representation comparing various embodiments and prior art under alternating drying conditions.

FIG. 5 is a graphical representation of the effects of different drying conditions on the acidification treatment. In these embodiments, several drying conditions were investigated. The first parameter investigated was the temperature at which the drying step occurred. Temperatures varying from room temperature to 350° C. were tested with a drying duration of 2 hours. There is a significant improvement in the effective loading (30%) when drying the sample at higher temperatures, with a superior capacity at 240° C.(WE=0.093 g $NH_3$/g CDC). Higher temperatures did not further enhance the effective loading.

FIG. 5 also provides a graphical representation comparing one embodiment of this invention with prior art Ammonia Removal Carbon (ARC). This comparison was performed in order to remove variability due to the experimental set-up, and therefore establish a baseline number using the current state of the art material in ammonia removal. Upon reception of the ARC, it was indicated that the ARC had an effective loading of about 0.17 g NH3/g ARC. The data obtained on the set-up for the ARC samples are reproducible (<1% in standard deviation) and provided an average of 0.059 g $NH_3$/g ARC. Based upon our current testing results, the materials provided effective loading ranging from 0.052 to 0.093 g $NH_3$/g CDC, demonstrating that this embodiment of the invention has, at the least comparable, and, at the best, better than capabilities comparable to the state of the art material.

Although the absolute values of the effective loading are currently in discussion, the ammonia removal capacity of a material is an intrinsic property. Consequently, if two materials are behaving similarly on one set-up, they should also perform similarly on a second test platform.

Figure 6:
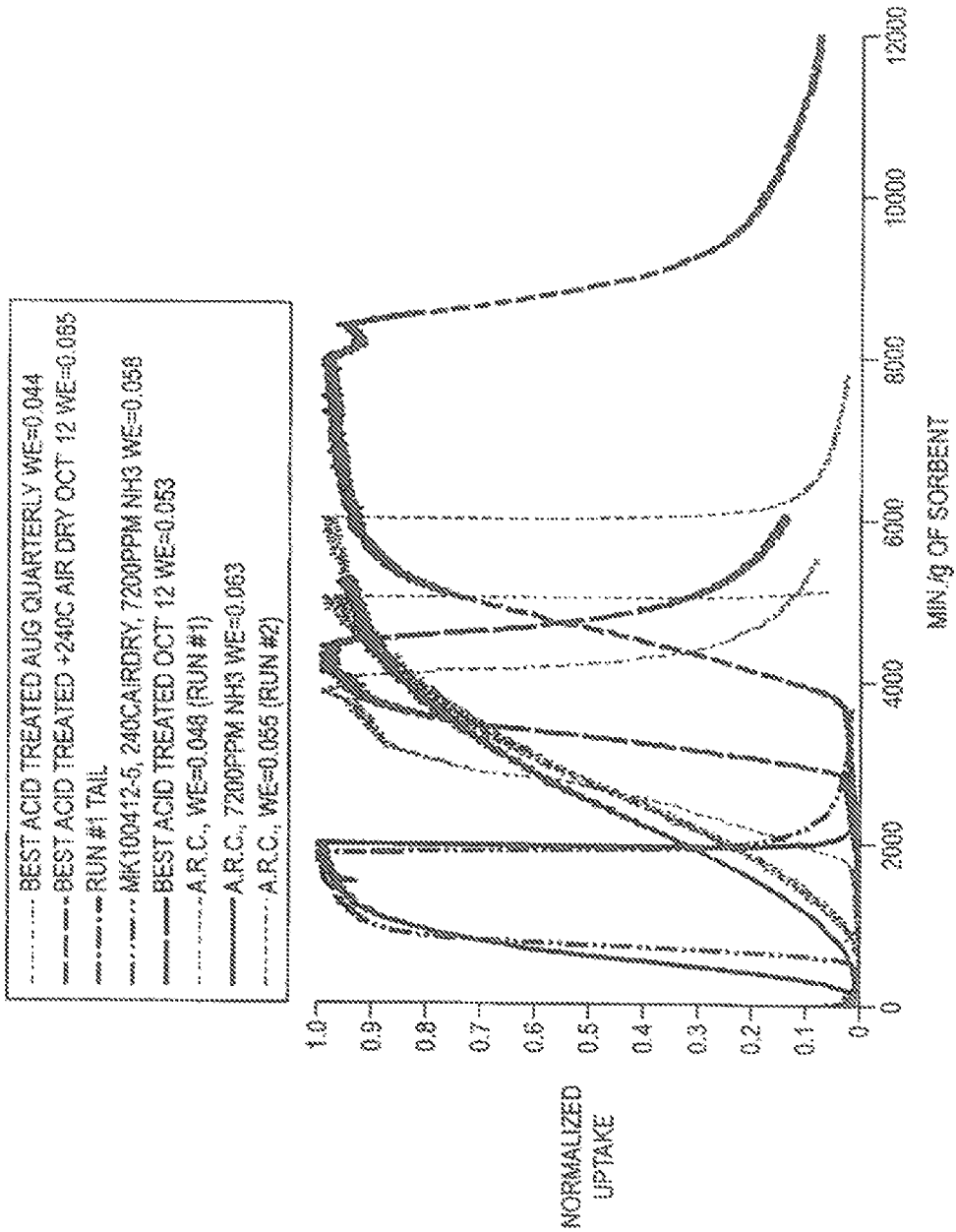
FIG. 6 is a graph comparing breakthrough curves of one embodiment with prior art.

FIG. 6 is a graphical representation of a comparison of the breakthrough points of one embodiment of this material with the prior art ARC. The elevated WE for the ARC samples can be attributed to a low slope for the signal rise while the breakthrough point is relatively early (<1,000 min/g of sorbent). Alternatively, the breakthrough point for the present embodiment is at a greater time (>1,500 min/g of sorbent) and corresponds to a sharp increase in signal. This difference is critical in practical terms. As seen in FIG. 6, by the time the present embodiment materials goes through breakthrough, the ARC material has already reached a significant portion of its loading capacity; at least 20%-30% when compared to the a first embodiment and up to 80%-90% when compared to a second embodiment. Consequently, the individuals/soldiers would be breathing an atmosphere free of ammonia for longer period of times with gas masks using the second embodiment when compared to gas masks using the prior art ARC.

In summary, several of the embodiment materials have demonstrated effective loadings comparable to the effective loading of prior art ARC. One embodiment of the invention has demonstrated an effective loading of 0.093 g $NH_3$/g CDC. Finally, the breakthrough times for the embodiments are significantly greater than the ones measured for prior art, ARC, demonstrating an enhanced performance over prior art materials.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

It is claimed:

1. A method of private and public protection against specific gas targets comprising the steps of:
    utilizing a protective filtration media, wherein said protective filtration media comprises an acid-treated carbide derived carbon;
    removing said specific gas targets from an atmosphere with up to 80% relative humidity; and
    retaining said specific gas targets with the protective filtration media.

2. The method of protection of claim 1, further comprising modifying said acid-treated carbide derived carbon for specific gas targets.

3. The method of protection of claim 1, wherein said protective filtration media comprises a surface area greater than 1,500 $m^2$/g.

4. The method of protection of claim 1, wherein said protective filtration media comprises a surface area greater than 2,200 $m^2$/g.

5. The method of protection of claim 1, wherein said protective filtration media comprises a pore volume greater than 1 $cm^3$/g.

6. The method of protection of claim 1, wherein said protective filtration media comprises a pore size of less than 2 nm.

7. The method of protection of claim 1, wherein said protective filtration media comprises a pore size of more than 2 nm and less than 50 nm.

8. The method of protection of claim 1, wherein said protective filtration media comprises a pore size of more than 50 nm.

9. The method of protection of claim 1, wherein said protective filtration media comprises a pore size distribution of about 0.1. Å to about 100 Å.

10. The method of protection of claim 1, wherein said protective filtration media has a particle size of about 900 μm to about 300 μm.

11. The method of protection of claim 1, wherein said protective filtration media has metal carbide at least 1% removed.

12. The method of protection of claim 1, wherein, said protective filtration media has metal carbide totally (100%) removed.

13. The method of protection of claim 1, wherein said protective filtration media has an effective loading of about 0.08 g of a target gas per 1 g of a material.

14. The method of protection of claim 2, wherein modifying said carbide derived carbon for specific gas targets further comprises the step of grinding said protective filtration media.

15. The method of protection of claim 2, wherein modifying said carbide derived carbon for specific gas targets further comprises the steps of: grinding and sieving of said carbide derived carbon; flowing halogenated gas; treating said carbide derived carbon with a vacuum annealed treatment; sieving said carbide derived carbon; treating said carbide derived carbon with an acid nitric treatment; and heating said carbide derived carbon.

16. The method of protection of claim 1, further comprising desorbing said specific gas targets from the protective filtration media.

17. The method of protection of claim 1, wherein the protective filtration media is a powder.

18. The method of protection of claim 1, wherein the protective filtration media is a fiber.

19. The method of protection of claim 1, wherein the retaining step comprises absorption.

20. The method of protection of claim 1, wherein the retaining step comprises adsorption.

* * * * *